Sept. 2, 1969   C. W. LAMBERT   3,464,310
INCURVATED FASTENER
Filed March 20, 1968   3 Sheets-Sheet 2
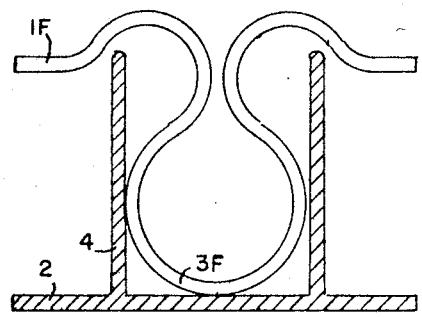
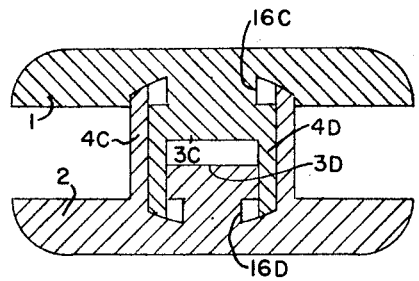
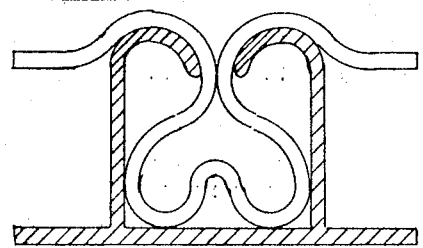
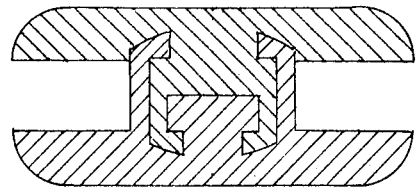
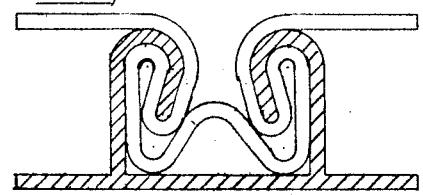
C.W. Lambert
INVENTOR.

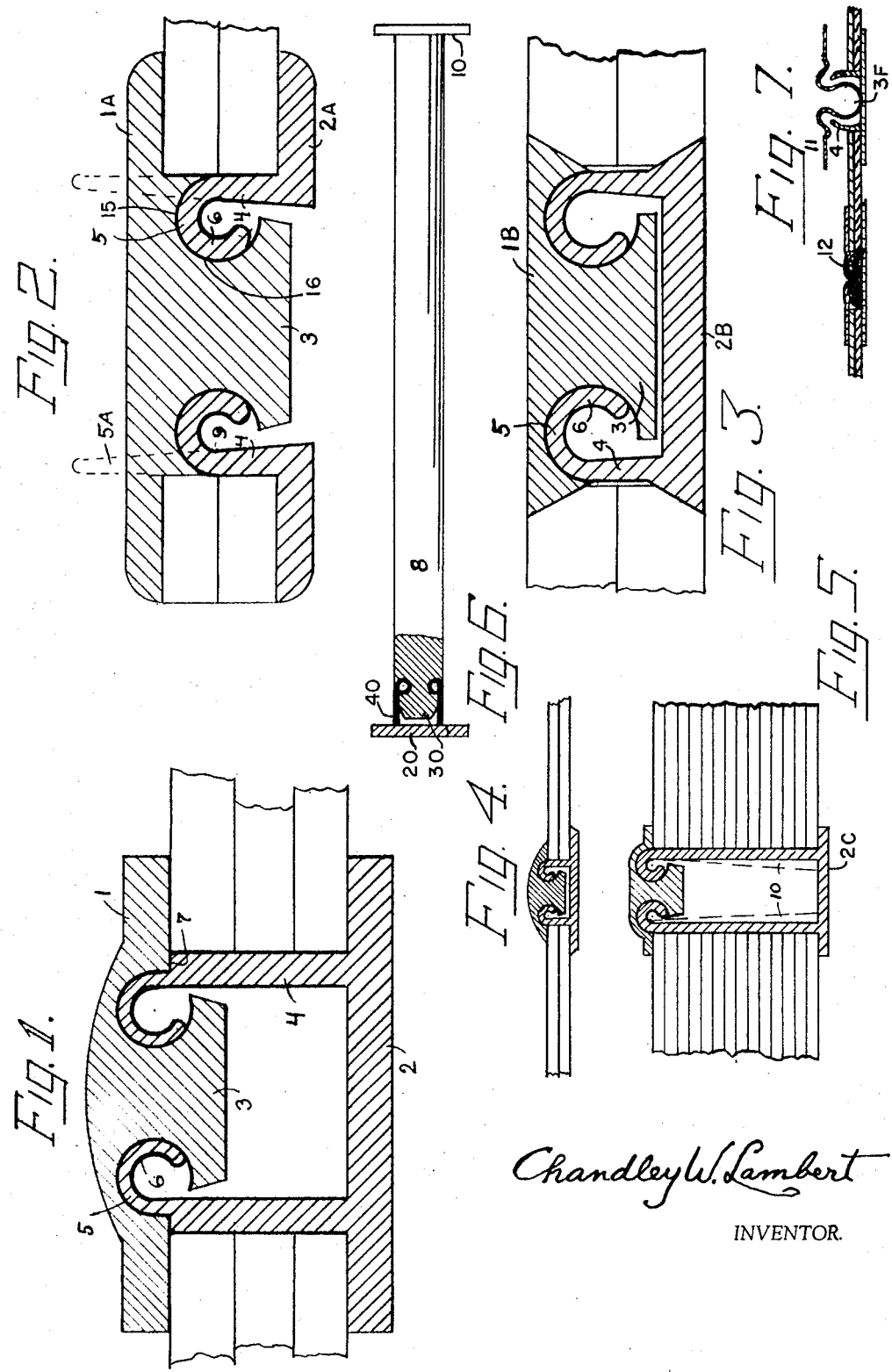

Sept. 2, 1969  C. W. LAMBERT  3,464,310

INCURVATED FASTENER

Filed March 20, 1968  3 Sheets-Sheet 3

INVENTOR.
Chandley W. Lambert

United States Patent Office 3,464,310
Patented Sept. 2, 1969

3,464,310
INCURVATED FASTENER
Chandley W. Lambert, Box 56, Lake Dallas, Tex. 75065
Filed Mar. 20, 1968, Ser. No. 714,691
Int. Cl. F16b *19/08*
U.S. Cl. 85—39      2 Claims

ABSTRACT OF THE DISCLOSURE

A two-part fastener comprising a base member with a tubular shank and a cap with a central projection formed with an annular concave neck. When the base and cap are forced together the tubular shank is deformed into the concave neck whereby the base and cap are secured together.

---

The invention relates to fasteners which are used to secure together two or more parts of a machine, appliance, frame, tool or materials.

When the end of a cylindrical tube is forced outwardly to form a fastener, the edge of the tube cracks, splits and is weakened.

In the incurvated fastener, the inwardly rolled edge of the tube is compressed, thickened and strengthened.

In the drawings:

FIG. 1 is a sectional view of the fastener in its assembled position.

FIGS. 2 to 6 are similar views illustrating several embodiments of the fastener.

FIG. 7 shows a fastener of the present invention formed from sheet metal.

FIGS. 8, 9 and 10 illustrate several steps in the assembly of a fastener of the type shown in FIG. 7.

FIGS. 11 and 12 are sectional views of a further modification.

Figure 13:
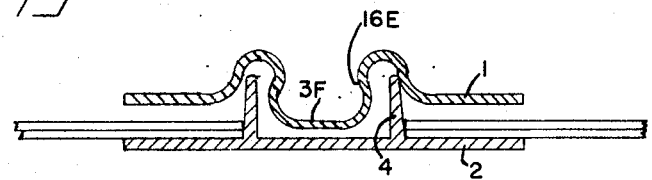
FIG. 13 illustrates a sheet metal fastener before the halves are secured together and FIG. 14 shows the completed connection.
Figure 14:

The fastener illustrated in FIG. 1 comprises a cap 1 which has an inwardly protruding part 3. An annular concave neck is formed in part 3. The second element of the fastener has a base 2 from which projects a cylindrical tube 4. To assemble the fastener the end of tube 4 is forced into the annular concave neck of the cap. The tube thickens as it passes around the curved guide and forms a curl at 6 which presses against the projection 3 with considerable force, holding the cap 1 and base 2 tightly against the joined parts.

FIG. 1 shows a shoulder 7 on tube 4 which prevents pinching or crushing the joined material by limiting the closing movement of the fastener.

Base member 2A in FIG. 2 has no shoulder on the tube and the full pressure of joining bears upon the joined material, as the parts of a frame. The embodiment in FIG. 2 also illustrates how end 5A of tube 4 is thickened as it engages the curved guide 15 at 5 and is forced against the concave neck 16.

FIG. 3 shows another special adaptation in which cap 1B and base 2B are flush with the surfaces of the joined materials. This one makes an excellent pivot for hand tools, shears, pliers etc. The beveled bearings, cap and base, tend to hold the blades in close contact while pinching or cutting.

FIG. 4 shows the fastener applied to two sheets of sheet metal or parts of a frame.

FIG. 5 shows another special fastener holding an assembly as of laminates.

FIG. 6 shows a pin held in place by a base 2 and incurvated tube 4.

The incurvated fastener is strong, quick closing and permanent. It can be made in very small, medium or large sizes. It is adaptable to almost any holding requirement between a paper clip and a machine bolt. Formed integrally with the cap or base may be knobs, pins, loops, hangers, guides, hinges, handles, etc.

More pressure is required for closing the incurvated than for closing other comparable fasteners. The end of the incurvature stays in place and holds permanently.

In large or long sizes, the tube 4 is tapered to greater thickness toward the base as shown at 5A and 4 of FIG. 2. The tube may have internal buttresses as suggested at 10 in FIG. 5.

Figure 15:
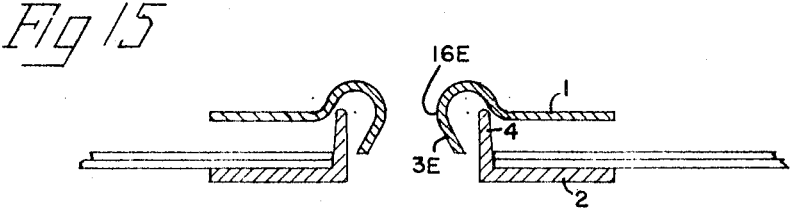
FIG. 15 is a modified form of sheet metal fastener and FIG. 16 represents the assembled position.

FIG. 7, at a smaller scale, shows two fasteners 11 and 12, one open the other closed, holding two thin pieces of sheet metal. This form of incurvated fastener can be closed with a hand tool. The fastener is formed by pressing disks of malleable sheet metal into the shapes of caps and bases. The fastener is closed by incurvation of the tube 4 and by pressured deformation of the cap into layered position. The cap is pressed down into layered position surrounding the incurvated tube 4. This form, also shown in FIGS. 8, 13 and 15, is designed for small to medium sizes, thicknesses and fastenings. It can be rapidly made in automatic machines and adapted to many uses.

The cap and inwardly protruding part 3F are formed from malleable sheet metal instead of being machined from solid blocks as in FIGS. 1, 2 and 3 and, consequently, are hollow. However, they perform the same function.

For stronger requirements in fastening is the double incurvated form of FIGS. 11 and 12.

In FIG. 11, cap 1 has extended center part 3C and cylinder 4D. Base 2 has center extension 3D and cylinder 4C. Both extensions, 3C and 3D, have concave necks 16C and 16D. One cylinder 4D fits closely into the other cylinder 4C.

This double form of incurvated fastener is for medium to strong holding requirements. It closely approaches the machine bolt and rivet in strength and permanence. This form of fastener can be an operating part of pivot of a tool or machine. The cap and base may be made in any shape, such as rollers in assemblies which are difficult or impossible to reach later.

The double incurvated fastener, of FIG. 11, requires great pressure to close. It is quick closing, strong and permanent. These qualities make it adaptable to assemblies using powered tools on assembly line.

Figure 16:
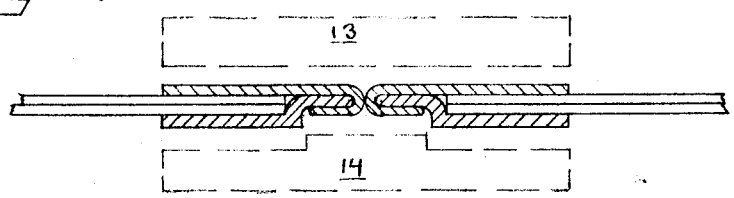

In FIG. 16 there is shown in broken lines the platen 13 and anvil 14 of the tool used in closing this particular fastener. The cap of FIG. 13 can be used with the base of FIG. 15 and vice versa.

Starting with FIGS. 13 and 15, showing incurvated fasteners in the smallest and lightest sizes, progressing through FIGS. 2 and 4 to the strong double incurvated form of FIG. 11, there is represented a complete line of fasteners which encompasses a wide range of sizes, strengths and usages.

I claim:
1. An incurvated fastener comprising; the combination of a cap; a base; a center projection secured to said cap; a curved concave indentation around said projection; a neck formed in said projection by said indentation; a cylindrical tube secured to said base; the end of said center projection having a diameter greater than the diameter of said neck and less than the inside diameter of said tube; the open end of said tube passing over the end of said center projection and entering said indentation; an external shoulder around said tube; a leading end of said tube having a reduced external diameter with the junction of the leading end and the remainder of the tube forming said shoulder as an external annular shoulder extending generally normal to the axis of said tube; and the open end of said tube incurvated into said indentation around said neck by pressing said cap and said base forcibly toward each other, compressing, thickening and strengthening the incurving end of said tube.

2. An incurvated fastener comprising, a base; a cap; center projections on said base and said cap; annular depressions forming necks in said projections; cylindrical tubes projecting from said cap and said base; one said tube fitting within the other said tube; and the open end of both said tubes fitting into the opposite annular depression and incurvated into the said opposite depression when said cap and base are pressed toward each other.

References Cited

UNITED STATES PATENTS

| | | | |
|---|---|---|---|
| 340,117 | 4/1886 | Holt | 85—37 |
| 605,833 | 6/1898 | Richardson | 24—216 |
| 618,868 | 2/1899 | Hall | 24—95 |
| 663,521 | 12/1900 | Shipman et al. | 24—95 |
| 878,550 | 2/1908 | Mead | 24—216 |
| 1,475,827 | 11/1923 | Hogarty | 85—39 |
| 1,835,524 | 12/1931 | Rinehart et al. | 85—4 |

EDWARD C. ALLEN, Primary Examiner